(No Model.)
A. H. MERRIMAN.
LOCKING DEVICE FOR CLUTCH MECHANISMS.
No. 390,886. Patented Oct. 9, 1888.
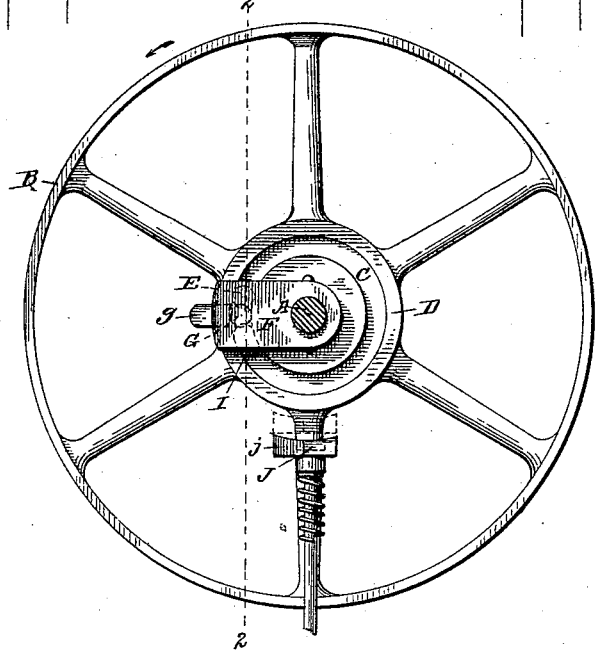
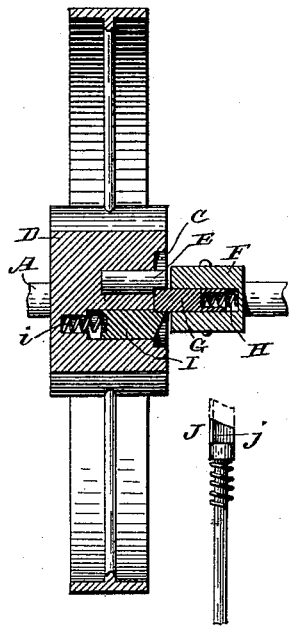
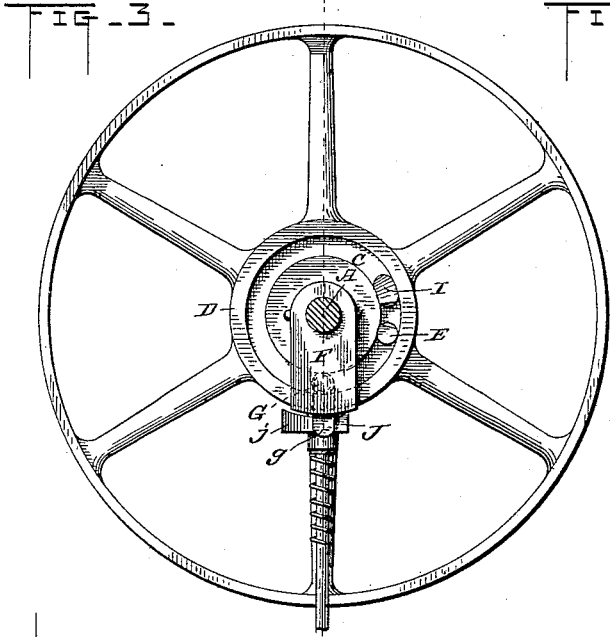
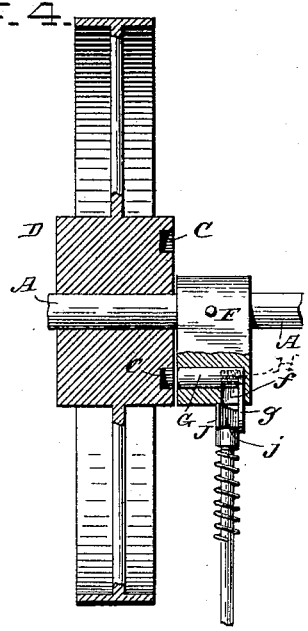
Witnesses
E. L. Smith
Henry Calvert
Inventor
Alanson H. Merriman
by Arthur W. Harrison
Atty.

UNITED STATES PATENT OFFICE.

ALANSON H. MERRIMAN, OF MERIDEN, CONNECTICUT.

LOCKING DEVICE FOR CLUTCH MECHANISMS.

SPECIFICATION forming part of Letters Patent No. 390,886, dated October 9, 1888.

Application filed January 19, 1888. Serial No. 261,298. (No model.)

*To all whom it may concern:*

Be it known that I, ALANSON H. MERRIMAN, a citizen of the United States, residing at Meriden, in the county of New Haven and State of Connecticut, have invented certain new and useful Improvements in Locking Devices for Clutch Mechanisms; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to improvements in clutch mechanisms; and my objects are to provide a device which will operate without the destructive and disagreeable hammering due to the rebound which usually occurs in this class of mechanism. For instance, in drawing or stamping presses, the parts are subjected to heavy strains, which, coupled with the spring of the metal, impart an impetus to the sliding bar or gate in its upward movement, which in turn, when an ordinary clutch mechanism is used, causes the shaft to run faster than the wheel for a moment; consequently when the shaft member of the clutch is overtaken by the wheel member a hammering and rebound take place, which destructive results are, as will be seen hereinafter, entirely obviated by the use of my invention.

My invention consists in the construction and combination of parts, as hereinafter de35 scribed, and pointed out in the claims.

In the drawings which accompany and form a part of this specification, Figure 1 is a side elevation, the clutch being in engaged position. Fig. 2 is a section on line 2 2 of Fig. 1. Fig. 3 is a side elevation, the members of the clutch being held out of engagement; and Fig. 4 is a section on line 4 4 of Fig. 3.

A designates the main shaft of the machine, to which my clutch mechanism is applied. On said shaft is loosely mounted the driving wheel or pulley B, said wheel being withheld from motion longitudinally of the shaft by any suitable means. The face of the hub D of wheel B is provided with an annular groove, C, concentric with the center of shaft A, and projecting from the bottom of said groove is a rigid stop, E. A spring-actuated locking bolt or latch, I, is carried by the hub D, and is arranged a distance from stop E corresponding to the diameter of movable stop G, and is equidistant from the center of the hub with said stop E. Said bolt is not perfectly round, being therefore prevented from turning in its socket, which it snugly fits, and its outer end is beveled or inclined, the lower portion of said bevel being in the direction in which the wheel B is to be driven.

F is a dog or carrier rigidly secured to the shaft A by pinning or otherwise, and G is a movable stop which is held in said carrier, and is provided with a lug or ear, $g$, said lug projecting through a slot, $f$, in the dog or carrier F.

H is a spiral spring of greater force than the spring $i$ of locking-bolt I, and is arranged to advance the movable stop G when released by the retiring mechanism to be now referred to.

J is a shoe having an inclined side, $j$, and is so placed that in its normal position it will cause the lug $g$ of movable stop G to retire said stop into its socket in the dog F whenever the shaft in its rotation brings the lug $g$ against said incline. The shoe J is mounted on the end of a rod and held in normal position by means of a spring. The rod and shoe are by any suitable means, as a foot-lever, (not shown,) under the control of the operator, so he can at any time lower the shoe out of the path of travel of the lug $g$.

The operation of my device is as follows: The machine being at rest, with the movable stop retired by reason of its lug $g$ being in contact with the shoe J, the wheel B is driven in the direction of the arrow by any suitable means, as a belt, but the clutch is still out of operation. When the operator wishes to start the operating parts of the machine to which the clutch is applied, he withdraws the shoe from its normal position, and the spring H forces the stop G outward. As the wheel B with the parts carried by its hub is at the time revolving, the locking-bolt I moves past the end of stop G, being forced inward by the superior strength of spring H and the end of stop G operating against the inclined end of bolt I. As soon as it has passed, however, and the end of stop G is engaged by the rigid stop E, it (the said locking-bolt I) is moved outward by its spring, thus securing the parts from any rebound whatever.

It is to be understood that I may dispense with the groove C, thus leaving the parts E and I projecting from the plain face of the hub, and I may reverse the relative arrangement of the stops and bolt; but I prefer the arrangement as shown; also, I do not limit myself to the precise form of retiring mechanism shown.

Having now described my invention, what I claim, and desire to secure by Letters Patent, is—

1. In a clutch mechanism, the combination of two co-operating rotary parts, one of which is provided with a movable stop and the other with a rigid stop, and a locking-bolt separated sufficiently to receive the end of the movable stop between them, substantially as described.

2. In a clutch mechanism, the combination, with a shaft carrying a movable stop, G, of a wheel loosely mounted on said shaft and having its hub provided with the rigid stop E and the locking-bolt I, and mechanism for retiring the movable stop G, substantially as described.

In testimony whereof I affix my signature in presence of two witnesses.

ALANSON H. MERRIMAN.

Witnesses:
WILLIS I. FENN,
HENRY DRYHURST.